Figure 1:
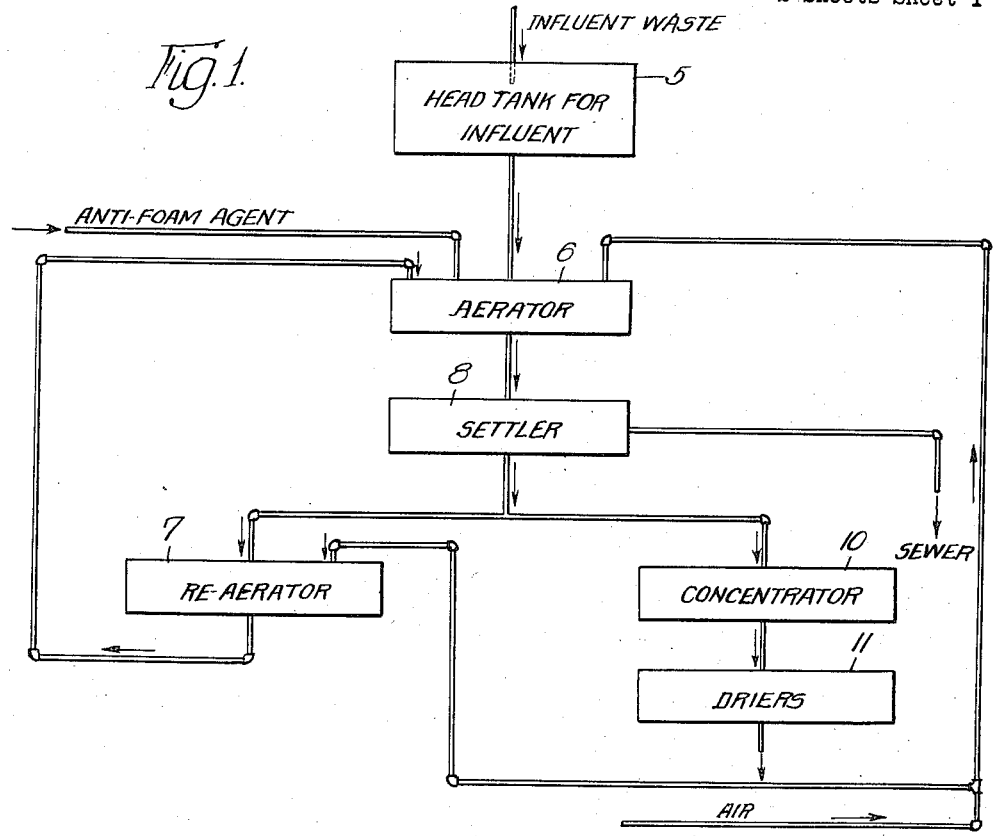

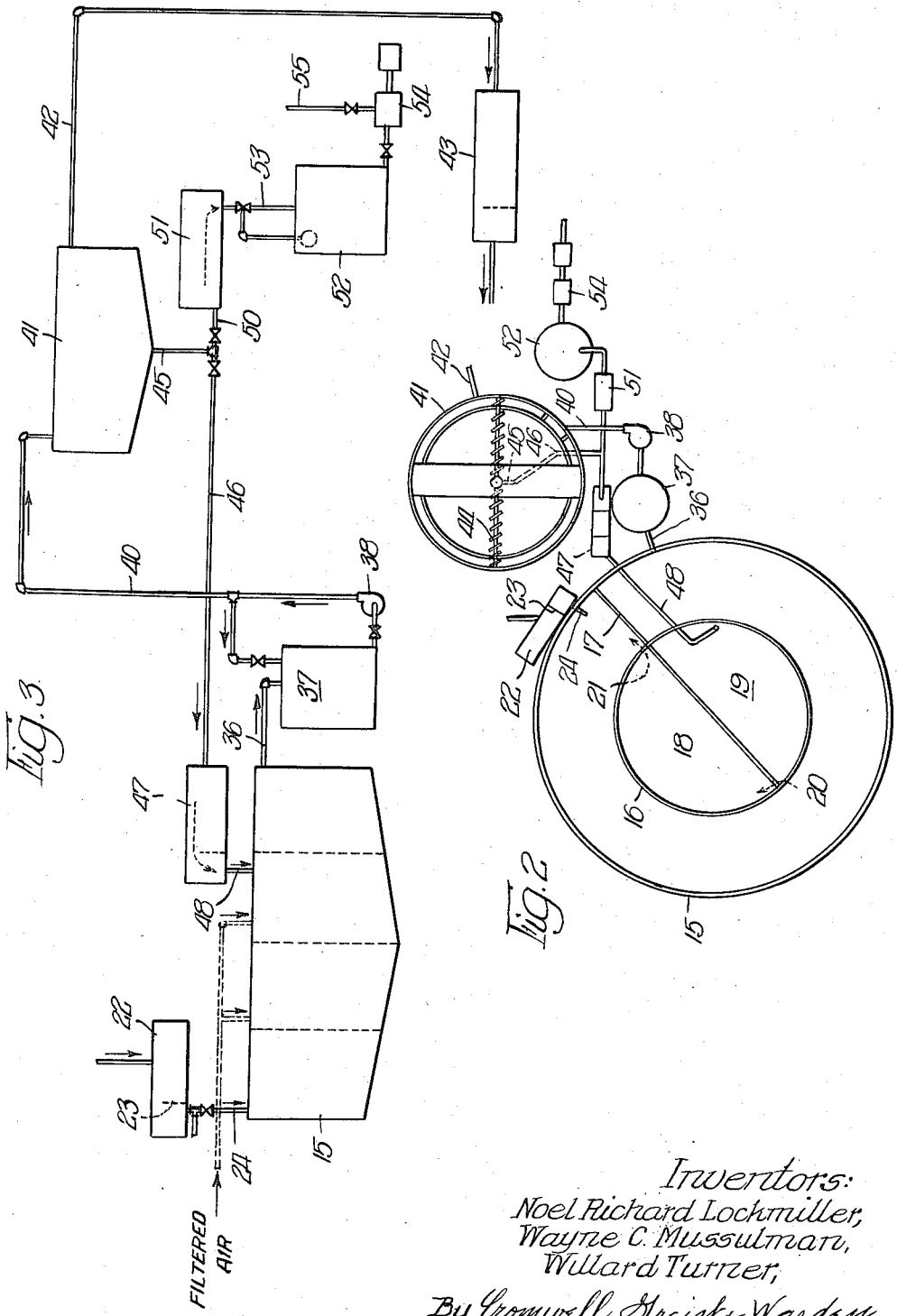

United States Patent Office 2,881,075
Patented Apr. 7, 1959

2,881,075
DISPOSAL OF CORN WET MILLING PROCESS WASTE

Noel Richard Lockmiller, Wayne C. Mussulman, and Willard Turner, Decatur, Ill., assignors to A. E. Staley Manufacturing Company, Decatur, Ill., a corporation of Delaware Application January 19, 1955, Serial No. 482,706

1 Claim. (Cl. 99—9)

This invention relates, generally, to a novel process for microbiologically converting plant waste from the corn wet milling process industry into (1) low cost, proteinaceous, nonhygroscopic, animal feed grade materials and (2) an innocuous effluent having such a low B.O.D. value that disposal thereof to the sewer or otherwise is minimized.

Disposal of waste from corn wet milling processing plants has long constituted a major problem of this industry which has been more or less serious, depending upon each individual company's particular situation. Pressure on the industry to minimize plant waste and discarded by-products has been simultaneously exerted from two main directions. As State and Federal authorities have become increasingly conservation minded, and as population around such plants has greatly increased in recent years so as to overtax existing sewage facilities and require expansion thereof, the corn wet milling industry has found it more and more difficult to dispose of plant waste either into streams or sewer systems. Furthermore, as manufacturing costs have continued to rise, it has become more and more imperative to minimize the losses represented by plant wastes and discarded by-products and to recover and convert these materials as much as possible into commercially valuable by-products.

In the early days of the corn wet milling industry, the loss of corn solids to the sewer was very large. Commencing in the 20's, the industry devoted considerable attention to the development of procedures for minimizing the loss of corn solids and the so-called "bottled-up" process was developed which resulted in the saving of a substantial portion of the soluble corn solids which had previously been lost. In the "bottled up" process, process water is re-used as much as possible and use of fresh water is minimized as much as possible. The resulting increase in concentration of corn solids solubles dissolved in the waste and process water made it economically possible to recover a large portion thereof by evaporation. The solubles so recovered are used to produce corn steep liquor, feeds and other commercially valuable products. A discussion of the development of the "bottled-up" process with particular emphasis on the activity and work on this process carried on by the A. E. Staley Manufacturing Company, at Decatur, Illinois, is contained in an article by Greenfield et al. (J. Ind. Eng. Chem. 39:583, 1947). Kerr also makes reference to the "bottled-up" process and a number of patents pertaining thereto on pages 53 and 54 of his text Chemistry and Industry of Starch, second edition, 1950.

Subsequent to the development of the "bottled-up" process and various refinements thereof, substantially no further innovations or improvements in the recovery of corn wet milling plant waste have been made prior to this invention, insofar as is known. In the meantime, there has been a tendency in the industry to diversify and upgrade the products of the corn wet milling process and now the larger plants usually convert a substantial portion of the starch which they produce into special starches of various types and into corn syrup and dextrose. At least one large starch plant produces a considerable output of monosodium glutamate from corn gluten.

The plant waste from the corn wet milling process commonly includes the following: process water, corn steep water condensate containing entrained solids, bone char wash water, ion exchange resin wash water, treated and untreated modified starch filtrates, corn syrup condensate containing entrained solids, hot filtrate obtained from the destarching of corn gluten, salt cake from the monosodium glutamate process, miscellaneous waste liquors from the pilot plant, corn steep liquor, mother liquor from the monosodium glutamate process, fine bran or grits, and coarse bran or grits.

There has now been provided according to the present invention a microbiological process whereby the plant waste from a corn wet milling plant may be economically converted into a proteinaceous, non-hygroscopic, wholesome animal feed grade material while producing a clear effluent having a very low B.O.D. and, occasionally, even a zero B.O.D. When the influent contains process water, the feed material produced by the microbiological process normally will have a substantial content of vitamin $B_{12}$ and other growth factors, and this content can, at an abnormally low cost, be substantially increased, particularly with respect to vitamin $B_{12}$ content. The microbiological conversion process is a continuous one and it is dependent upon and utilizes an aerophilic, non-hydroscopic, flocculent, heterogeneous culture of microorganisms which upon being supplied with oxygen, feed on the nitrogenous, organic and mineral contents in the plant waste and produce a culture which is adapted to be concentrated by settling so as to leave a supernatant body of liquid having a low B.O.D. value. The process produces an excess of culture over that required for maintaining the process, and this excess is recovered by a suitable method of harvesting and drying and used as a nutritious animal feed ingredient.

The culture seed for the process consists of microorganisms which occur naturally in corn wet milling waste as well as in other sources such as lake water and cooling tower water. The culture can be developed satisfactorily by cultivating the seed microorganisms in the waste by (1) incubating and aerating them in a turbulent zone (e.g. the aerator), (2) dewatering the resulting cultivated microorganisms in a quiescent zone (e.g. the settler) by sedimentation and decantation, (3) re-aerating the dewatered culture in a second turbulent zone (e.g. the re-aerator), and (4) returning the re-aerated culture to the aerator where it is fed more waste (e.g. influent) so that still more culture is produced. At the beginning, the foregoing cycle of steps is repeated until the culture solids content of the influent-culture mixture in the aerator is ideally about 0.5 to 1.0% on a weight-volume basis (w./v.) e.g. 0.5–1 gram per 100 milliliters. Once the process has been established and is under way, then it may be easily controlled on a continuous basis with two products or materials being discharged from the process. One product is clear effluent having a low B.O.D. value (e.g. 0–300 p.p.m.) which is discharged to sewer. The other product is that portion of the culture produced in excess of the requirements to maintain the process. This excess culture is dewatered, such as by centrifuging, filtration or evaporation, and then dried and used in animal feeds.

The process of the present invention is distinguished from other known microbiological treatment processes in the following respects:

(a) The development of a thermophilic heterogeneous microbial culture of aerophilic microorganisms characterized by:

(1) Being devoid of organisms obtained from sewage, sewers or activated sludge.
(2) Its ability to grow at relatively high temperatures up to 66° C.
(3) Its property of flocculating and settling in a quiescent zone so that it can be dewatered by decantation.
(4) Its non-filterability through filter cloth or paper.
(5) Its non-hygroscopicity when dried.
(6) Its low vitamin $B_{12}$ content when not fed cobalt or corn wet milling process water.
(7) Its high vitamin $B_{12}$ content when fed cobalt and/or process water.
(8) Its property of efficiently reducing B.O.D. values of corn wet milling wastes which it grows in.
(9) Its ability to grow and sustain itself on nutrients of widely varying composition.
(10) Its ability to survive in open air vessels.

(b) The continuous cultivation of the culture by feeding it unusually large amounts of organic matter per unit of aerator capacity, at either conventional or unusually high temperatures, and in aerated aqueous suspensions having a pH value of from about 5 to 11 and containing up to about 3.0% w./v. crude culture solids.

(c) The continuous transformation of corn wet milling process waste into economically recoverable, non-hygroscopic feed grade, microbial solids containing substantial amounts of protein, vitamin $B_{12}$ and other growth factors.

(d) The continuous recovery of the culture solids by flocculation, sedimentation, decantation, filtration, centrifugation, evaporation and/or desiccation.

One of the unexpected features of the invention is the high content of vitamin $B_{12}$ produced in the culture when the influent contains process water and the even greater content of vitamin $B_{12}$ that is produced when a cobalt compound (e.g. cobaltous chloride hexahydrate) is added so as to be present in the process.

An object of the invention is an economical, efficient, conveniently operated and dependable microbiological process for treating the waste from the corn wet milling process so as to produce (1) a nutritious animal feed material free from any objectionable microorganisms, and (2) an effluent having a substantially reduced B.O.D. value.

A further object of the invention is the production by such a process of an animal feed containing a high concentration of vitamin $B_{12}$, with the vitamin $B_{12}$ content being obtained at a very low cost.

A further object of the invention is the provision of such a process which is desirably carried out under a combination of certain preferred conditions, but which is not unduly sensitive to certain variables and conditions that will be commonly encountered in large-scale commercial practice, such as: normal fluctuation in concentration and composition of influent plant waste, open vessel operating conditions, normal changes in temperature and in pH conditions.

A further object of the invention is the provision of such a process which may be conducted in a relatively inexpensive installation which does not require expensive controls, high labor costs or high maintenance and which may be continuously operated for long periods without shutdown.

Certain other objects of the invention will, in part, be obvious and will, in part, appear hereinafter.

Figure 4:
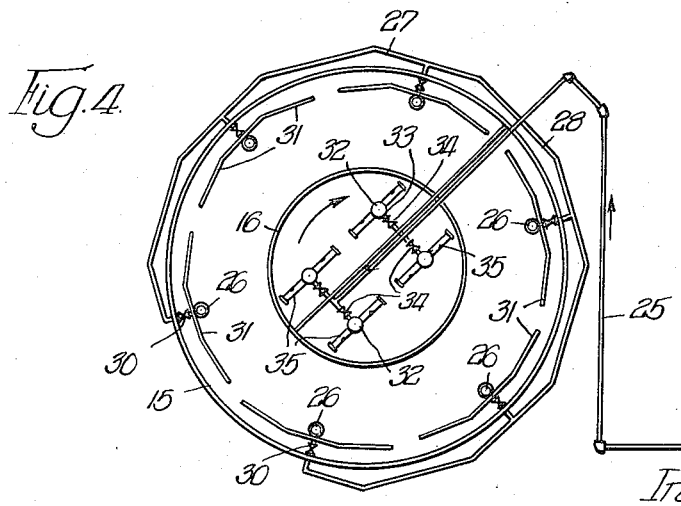

For a more complete understanding of the nature and scope of the invention, reference may now be had to the following detailed description thereof taken in connection with the accompanying drawings, wherein:

Fig. 1 is a flow diagram illustrating the invention;
Fig. 2 is a diagrammatic plan view of a plant-size installation in which the invention may be practiced;
Fig. 3 is an elevational view of the installation shown in Fig. 2; and
Fig. 4 is a plan view showing the aeration flow diagram for the installation shown in Fig. 2.

Referring now to Fig. 1, plant waste from a corn wet milling plant is introduced into an influent head tank 5. The installation illustrated diagrammatically in Figs. 1–4 has satisfactorily treated 537,000 gallons per day of influent, the influent being loaded into the system at a rate up to 800 pounds B.O.D. per thousand cubic feet aerator capacity per day. Such influent may contain up to 15,000 p.p.m. B.O.D., have a pH of 3.0 to 12.5, and a temperature up to about 66° C.

From the head tank 5 the influent is introduced into an aerator 6, the contents of which are maintained at a temperature from 1° C. to 66° C. Air is introduced into the bottom of the aerator at a rate of about 300–400 cubic feet per pound of influent B.O.D. Re-aerated concentrated culture is also introduced into the aerator 6 from a re-aerator 7 wherein it is re-aerated at a rate of about 300–400 cubic feet per pound of influent B.O.D. If desired, an anti-foam agent such as crude vegetable oil may be added dropwise into the aerator 6.

After passing through the aerator 6 the treated mixture of influent and culture is conducted to a settler 8 in which the culture settles to the bottom in the anaerobic state and is gently worked to the outlet opening therein by suitable scrapers. Clear supernatant effluent overflows an outlet weir in the top of the settler 8 and is discharged to sewer or stream.

Since the process normally functions to produce culture at a rate substantially in excess of the amount required to maintain the process operating efficiently, the excess culture from the bottom of the settler 8 not required for the process is diverted into suitable dewatering or concentrating equipment for harvesting such as centrifuges, filters or evaporators as indicated at 10. The culture which is required for operating the process is introduced into the re-aerator 7 from the settler 8.

Ferric chloride or other known chemicals may be used to hasten filtration by agglomeration of the microbial aggregates into more compact floccules or precipitates. Corn bran, fine grits or gluten may be used as filter aids. The concentrated or dewatered culture from the centrifuge, filter or evporator 10 is dried in commercial driers of known type indicated at 11 and the crude dried culture is used as an ingredient of animal feeds. Care should be exercised during drying so as not to impair the nutritional values of the dried culture.

In order to develop maximum content of growth factors, particularly vitamin $B_{12}$, in the culture for use as feed material, a cobalt compound, e.g. cobaltous chloride hexahydrate, is introduced into the influent either in the header 5 or in the aerator 6. The cobalt compound need not be continuously intrduced, although that procedure is desirable. When the influent contains process water, the content of vitamin $B_{12}$ is surprisingly high even though no cobalt is added. Since the only increase in cost necessary to bring about the maximum vitamin $B_{12}$ content is the cost of the cobalt compound (which is relatively inexpensive and needs to be used only in very minor amounts), it constitutes a very inexpensive means of producing vitamin $B_{12}$, and this is one of the desirable features of the invention.

The dred culture obtained from the process will usually have a composition within the range of the following table:

TABLE I

Composition of dried culture

| | | |
|---|---|---|
| Total nitrogen | percent | 2.0 to 9.0 |
| Total nitrogen ×6.25 (protein) | do | 12.5 to 56.3 |
| Ash | do | 20.0 to 50 |
| Calcium in ash | do | 34.0 to 36.0 |
| Phosphorus in ash | do | 12.0 to 14.0 |
| Vitamin $B_{12}$ | milligrams per pound | 0.16 to 7.4 |

An increased production of culture solids and culture protein is also obtained by feeding the culture added inorganic nitrogen, phosphorus, magnesium, iron, manganese, zinc, potassium, sulfur and chloride. These nutrients may be added in the form of known inexpensive chemicals to the influent in the header tank 5. The following table contains a list of suitable forms and amounts in which nutrients may be added:

TABLE II

| Element | Compound | Elementary Concentration in Influent, p.p.m. |
|---|---|---|
| N | $(NH_4)_2SO_4$ | 100 |
| S | $(NH_4)_2SO_4$ | 114 |
| K | $KH_2PO_4$ | 188 |
| P | $KH_2PO_4$ | 150 |
| Fe | $FeCl_3.6H_2O$ | 1 |
| Mg | $MgCl_2.6H_2O$ | 100 |
| Mn | $MnCl_2.4H_2O$ | 1 |
| Zn | $ZnCl_2$ | 1 |
| Cl | (above chlorides) | (1) |

[1] Normally more than adequate.

Table III below shows the effect of elementary feeding with these nutrients:

TABLE III
*The effect of elementary feeding*

| Culture No. | 1 | 2 | 3 | 4 | 5 | 6 |
|---|---|---|---|---|---|---|
| Elements Fed | N, S, K, Cl, P, Co. | No. 1+Mg | No. 2+Mn | No. 3+Zn | No. 4+Fe | Co (alone). |
| Culture Yields [1] | 64.8 | 64.2 | 64.3 | 62.9 | 63.4 | 49.0. |
| Percent Protein in Culture Solids | 27.5 | 32.7 | 30.6 | 30.7 | 31.4 | 31.7. |

[1] Pounds of dry substance culture produced per 100 pounds of influent B.O.D.

Investigation has indicated that the high content of vitamin $B_{12}$ produced even without cobalt being added is due largely to the presence of process water in the influent. When this normal constituent of corn wet milling plant waste is omitted, there is a marked decrease in the vitamin $B_{12}$ content.

The following table serves to bring out clearly the beneficial effect of feeding cobalt in the effluent on the vitamin $B_{12}$ content of the dried culture:

TABLE IV
*The effect of feeding 1 p.p.m. of cobalt on the vitamin $B_{12}$ content of the dried culture*

| Sample No.[1] | No. Days Fed Cobalt | Milligrams $B_{12}$ per lb. before Cobalt | Milligrams $B_{12}$ per lb. after Cobalt |
|---|---|---|---|
| 447-46-2 | 7 | 0.17 | 0.32 |
| 447-24-3 | 21 | 0.17 | 0.51 |
| 447-47-1 | 110 | 0.17 | 2.96 |
| 447-48-2 | 28 | 1.41 | 3.35 |
| PP 4-9 | 14 | 0.16 | 0.73 |
| PP 4-28 | 33 | 0.16 | 2.67 |
| PP 5-13 | 48 | 0.16 | 3.69 |
| PP 5-28 | 63 | 0.16 | 2.04 |
| PP 7-10 | 25 | 1.20 | 2.66 |
| 660-1-C [2] | 46 | 1.20 | 7.40 |

[1] Process water was withheld from these samples.
[2] This sample contained process water during 19 of the 46 days.

When the culture was fed influent containing process water without added cobalt, the culture contained 3.6 mg. of vitamin $B_{12}$ per pound of dry substance.

It will be seen that in all instances in which cobalt was fed, there was a large increase in the vitamin $B_{12}$ content of the dried culture. It will be further noted that when process water was present for at least a portion of the feeding period and cobalt was added, there was an outstanding increase in vitamin $B_{12}$ content in the culture. Normally, process water is continuously present.

On the basis of adequate experience in operating the process of this invention, the following preferred operating conditions and factors have been found and fully confirmed:

(a) The optimum pH value of the culture-influent mixture is 7.0 to 8.5.

(b) The length of the bubble path should be at least about 1.5 to 2 feet long for efficient utilization of the air.

(c) Approximately 600 to 800 cubic feet of air per pound of influent B.O.D. is required with about half of this air being used to aerate the culture-influent mixture and the other half being used to re-aerate the culture in the re-aerator.

(d) The temperature of incubation and maintenance of the culture should be about 38 to 43° C.

(e) The salt content of the culture-influent mixture should be below 2% w./v.

(f) The culture solids content of the culture-influent mixture should be from about 0.5 to 1.0% w./v.

(g) The rate of loading influent solids should at least be approximately 300 pounds of B.O.D. per 1000 cubic feet of aerator-reaerator capacity per day but this may be increased substantially according to the rate of aeration.

(h) The ratio of the daily influent volume to the aerator-reaerator volume should be 0.1 to 5.0.

(i) When it is desired to develop the growth factors, and particularly the vitamin $B_{12}$ content of the dried culture, added cobalt is fed to the process. One part of cobalt as cobaltous chloride hexahydrate per million parts of influent stimulates the production of large amounts of vitamin $B_{12}$, although this amount of cobalt does not appear to be highly critical.

Reference is now made to Figs. 2–4 of the drawings for a description of the installation illustrated therein in which the process of the present invention may be efficiently carried out on a plant scale. The largest piece of equipment involved, and the one about which the process is centered, comprises an outer cylindrical tank or basin 15 in which is located a concentric inner tank or basin 16 which constitutes the re-aerator. The annular chamber between the vertical walls of the inner and outer tanks 16 and 15 constitutes the aerator chamber. The tanks 15 and 16 are closed at the bottom by an integral floor which is conical in shape as shown in Fig. 3. The tanks 15 and 16 may suitably be formed of concrete and a satisfactory design has been found to be one in which the diameter of the larger tank or basin 15 is approximately one and one-half times that of the inner tank or basin 16.

The outer basin 15 is provided with a vertical partition 17 which extends from the floor of this basin to the top and shuts off communication from opposite sides. An extension of the partition 17 divides the inner basin 16 into two compartments which are indicated at 18 and 19.

Communication between the compartments 18 and 19 is provided by means of an underflow port 20 located in the bottom corner of the partition 17 adjacent the inner end thereof. The port 20 (Fig. 2) permits contents from compartment 19 to flow through into the compartment 18. Communication between the re-aerator compartment 18 and the aerator basin 15 is provided by means of an underflow port 21 (Fig. 2) in the outer wall of the inner tank or basin 16 adjacent to the bottom thereof and to the partition 17, as indicated.

Thin watery waste from a corn wet milling plant is received in a head tank 22 and constitutes the influent for the disposal process. This head tank is located at a level above the outer basin 15. Influent in the tank 22 overflows a baffle 23 into a compartment at one end from which it is discharged by gravity through a line 24 into the top of the outer basin 15 at the place indicated in Figs. 2 and 3.

Re-aerated culture flows from the compartment 18 of the inner re-aerator basin 16 through the underflow port 21 into the aerator tank 15 where it mixes with the influent received from the head tank 22 and then proceeds counterclockwise (as viewed in Fig. 2) through the elongated annular path of the aerator chamber during which time it is subjected to active aeration and circulation.

Both the outer aerator tank 15 and the inner re-aerator tank 16 are provided with an aeration system of known type and design which is shown diagrammatically in Fig. 4. Unsterilized, but preferably filtered, air is delivered under suitable pressure through an air line 25. Six air lifts 26—26 are equi-spaced around the interior of the outer basin 15 adjacent the bottom and outer wall thereof, with each air lift being supplied from one of two headers 27 or 28 branching off from the air main 25. Each of the air lifts 26 is provided with a suitable valve 30 for either shutting off or regulating the rate of air flow thereto. Nozzle headers 31—31 extend at opposite sides of each of the air lifts 26, as shown for sparging air into the liquid contents of the aerator. This air distribution system provides sufficient aeration as well as circulation to the culture-influent mixture in the outer basin.

Aeration for the re-aerator chamber or basin 16 is provided by four air lifts 32—32 disposed therein, each of which is served with air from the main 25 through a branch line 33 provided with a valve 34. Four nozzle headers 35—35 extend from each of the air lifts 32, as shown.

The aeration system for the aerator chamber 15 and re-aerator chamber 16 is shown and described in greater detail in Walker Patent No. 2,616,676, dated November 4, 1954. It will be understood that other known aeration systems may also be used.

In operation: The culture is initially developed by filling the aerator tank 15, re-aerator tank 16, settler 41, and the interconnecting piping system with water. Air is then sparged into the water in the aerator and re-aerator tanks and a continuous flow of influent is introduced into the aerator. The culture grows from the microbial seed which occurs naturally in the water-influent mixture. The culture is then dewatered in the settler 41 by flocculation, sedimentation and decantation and the clear or opalescent supernatant liquor is discarded to the sewer through the line 42. The dewatered or thickened culture is conveyed from the bottom of the settler 41 to the re-aerator 16 wherein it is re-aerated prior to being fed into the aerator 15 through the underflow passage 21. This process is continued until the culture solids content of the culture-influent mixture in the aerator is increased to 0.5 to 1.0%. Thereafter, the process is continued in the same manner as described but excess culture is withdrawn and harvested as described.

The process is operated so that by the time the culture-influent mixture reaches the partition 17 on the side opposite from the head tank 22, the B.O.D. of the influent will have been reduced to 300 or lower, depending on the B.O.D. of the influent. The culture-influent mixture overflows through a line 36 into a collector tank 37. A centrifugal pump 38, the inlet of which is connected to the bottom of the tank 37, serves to withdraw the culture-influent mixture from tank 37 and deliver it through a line 40 into a settler 41. In the settler 41, the culture settles to the bottom in the anaerobic state while the clear supernatant liquor overflows through a line 42 to a weir box 43 which discharges to the sewer.

A rotary scraper indicated at 44 in Fig. 2 moves the settled culture toward the central opening in the bottom of the settler 41 from which it is discharged through a line 45 (Fig. 3). A portion of the settled and concentrated culture is conveyed through line 46 to a head tank 47. The concentrated culture from the tank 47 is introduced into the re-aerator compartment 19 through a line 48 as indicated in Figs. 2 and 3. The balance of the concentrated culture from the bottom of the settler 41 which is not required for continued operation of the process in tanks 15 and 16, is passed through a discharge line 50 to a weir box 51. The contents of the weir box 51 are discharged into an accumulator tank 52 through a line 53 from which tank 52, a pump 54 delivers excess culture through line 55 to filters or other dewatering equipment. The dewatered culture is dried and the dry product is a proteinaceous, non-hygroscopic, feed grade material containing substantial amounts of growth factors including vitamin $B_{12}$. As described above, the vitamin $B_{12}$ content may be greatly increased by feeding cobalt to the process.

It will be understood that the process may be carried out in any suitable equipment and is not dependent on the particular types and arrangement of equipment shown in the drawings.

Having fully described the nature of the invention and preferred and illustrative embodiments thereof, what is claimed as new is:

A continuous process of treating corn wet milling waste so as to produce substantial amounts of proteinaceous microbial solids suitable for animal feed and containing growth promoting substances including vitamin $B_{12}$ while substantially reducing the B.O.D. values of said waste, which comprises, continuously introducing an influent stream of corn wet milling waste and a stream of re-aerated settled culture solids derived from the process into one end of an aerator chamber of elongated flow path filled with the resulting mixture of culture and influent, maintaining the culture solids content of said culture-influent mixture in the range of about 0.2 to 3% on a weight-volume basis, the pH of said culture-influent mixture in the range of about 5 to 11, and the temperature of said culture-influent mixture at a temperature in the range of 1 to 66° C., aerating said culture-influent mixture in said aerator chamber as it moves toward the opposite end thereof, continuously withdrawing treated culture-influent mixture from said opposite end of said aerator, introducing the withdrawn treated mixture into a quiescent zone, removing low B.O.D. effluent from adjacent the top of said quiescent zone, removing settled culture solids in the anaerobic state from adjacent the bottom of said quiescent zone, re-aerating an amount of said settled culture solids sufficient to continuously treat said stream of influent, and recovering the surplus of settled culture solids, said influent of corn wet milling waste being loaded at a rate of from about 300 to 800 pounds B.O.D. per thousand cubic feet of aerator capacity per day, said culture being developed and maintained from organisms which occur naturally in corn wet milling waste and being a thermophilic heterogeneous microbial culture of aerophilic microorganisms characterized by: (1) ability to grow at temperatures up to 66° C.; (2) the property of flocculating and settling in a quiescent zone permitting dewatering by decantation; (3) retention on filter paper; (4) being non-hygroscopic when dried; (5) a low vitamin $B_{12}$ content when not fed cobalt and a substantially increased vitamin $B_{12}$ content when fed cobalt; (6) ability to grow and sustain itself on nutrients of widely varying composition, and (7) ability to survive in open air vessels.

References Cited in the file of this patent

UNITED STATES PATENTS

| | | |
|---|---|---|
| 1,394,698 | Trent | Oct. 25, 1921 |
| 2,595,499 | Wood | May 6, 1952 |
| 2,681,881 | Bennett | June 22, 1954 |
| 2,703,302 | Rickes | Mar. 1, 1955 |

FOREIGN PATENTS

| | | |
|---|---|---|
| 975,304 | France | Nov. 19, 1948 |
| 496,632 | Canada | Oct. 6, 1953 |

OTHER REFERENCES

Liggett et al.: "Corn Steep Liquor in Microbiology," Bacteriological Reviews, 12, No. 4, December 1948, pp. 297 to 311.